Sept. 14, 1926. 1,599,772
F. A. KRUSEMARK
TIRE MOLD
Filed Dec. 22, 1925 2 Sheets-Sheet 1
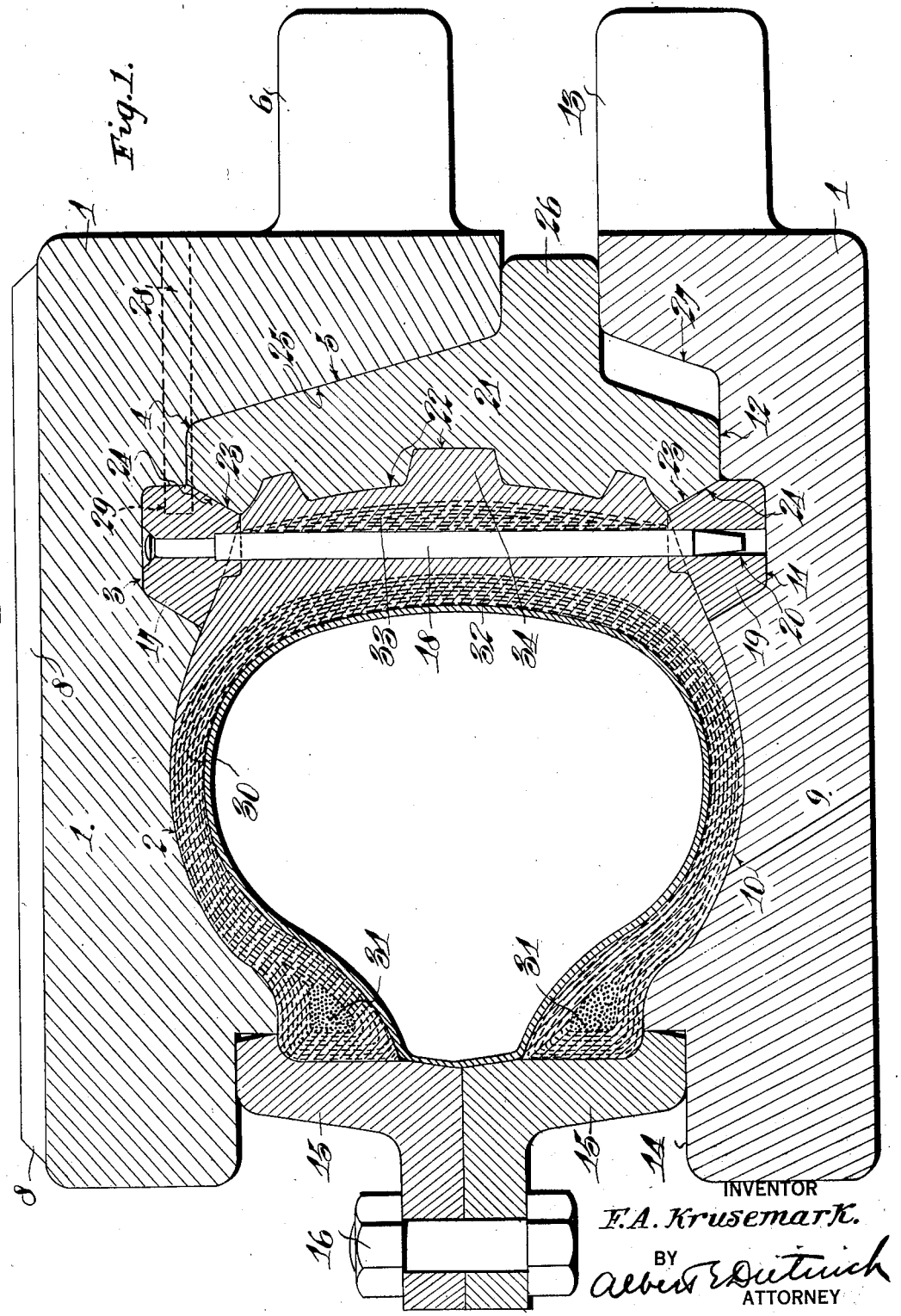
INVENTOR
F.A. Krusemark.
BY
ATTORNEY Sept. 14, 1926.  
F. A. KRUSEMARK  
TIRE MOLD  
Filed Dec. 22, 1925  
1,599,772  
2 Sheets-Sheet 2
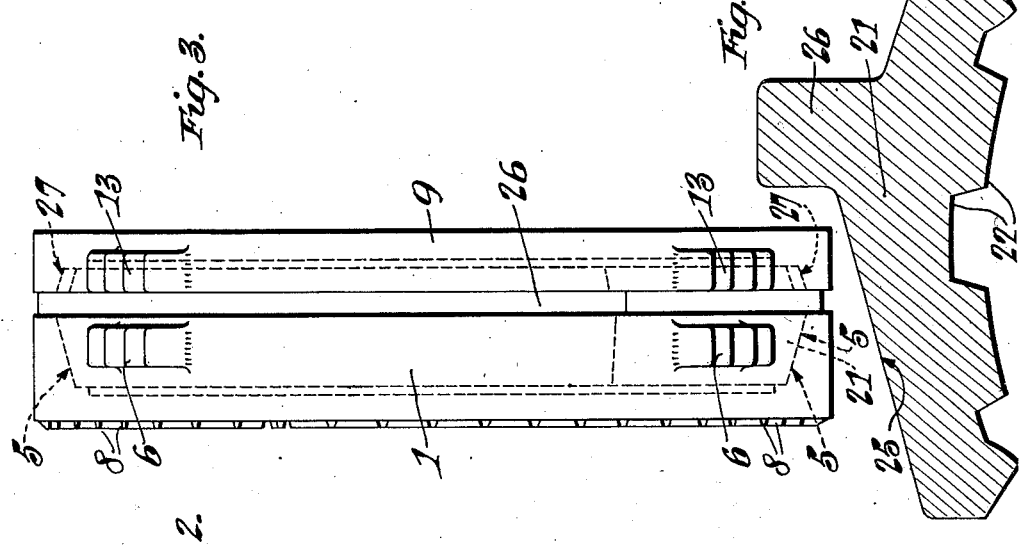
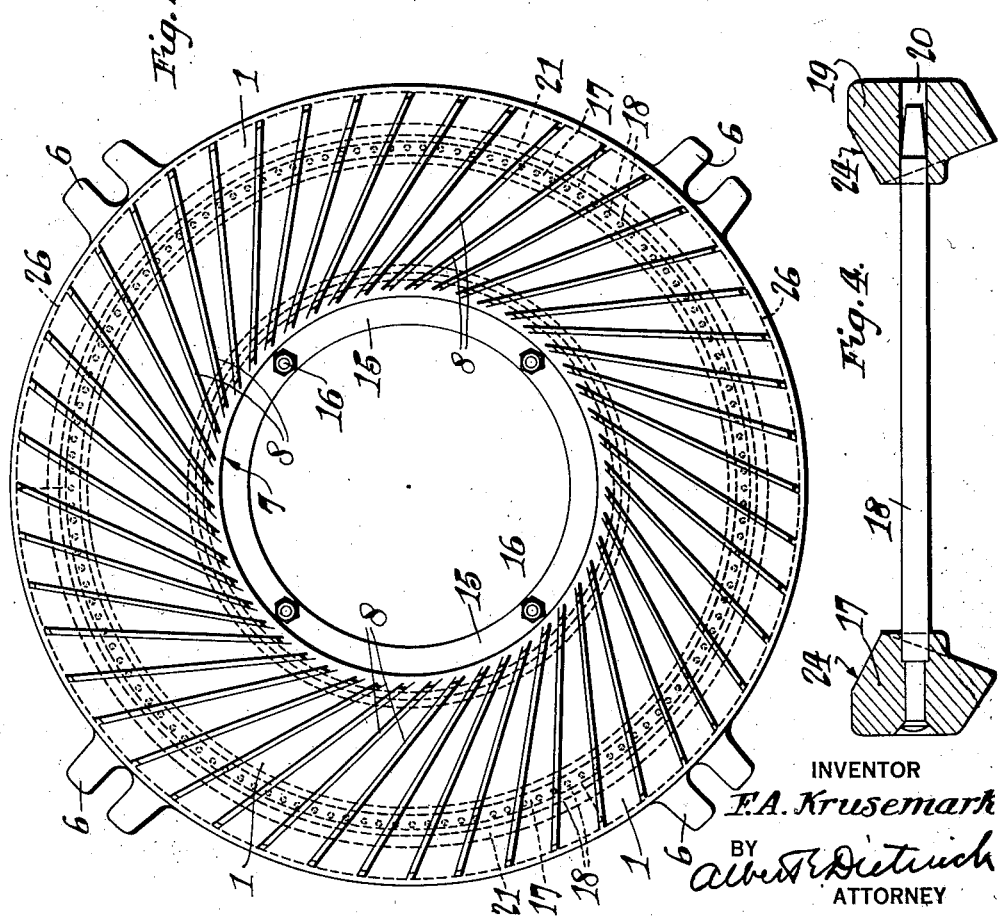
INVENTOR  
F.A. Krusemark  
BY  
ATTORNEY Patented Sept. 14, 1926.

1,599,772

UNITED STATES PATENT OFFICE.

FREDERICK A. KRUSEMARK, OF AKRON, OHIO, ASSIGNOR TO LAMBERT TIRE & RUBBER CO., OF BARBERTON, OHIO, A CORPORATION OF ARIZONA.

TIRE MOLD.

Application filed December 22, 1925. Serial No. 77,049.

The invention generally relates to the art of rubber tire building and has for its object to provide a simple and efficient mold structure by the use of which shaping and vulcanization of the tire may be more effectively accomplished and the tire more easily stripped from the mold than has heretofore been possible in the types of molds now commonly used.

In its more detailed nature the invention seeks to provide a new and improved mold structure adaptable to use in the manufacture of ventilated puncture proof pneumatic tires of the kind disclosed in my application for patent Serial Number 77,048 filed December 22, 1925, and in which features of construction are provided which assure desired centered relation of the tread ring with respect to the hole forming pins and also for the ready removal of those parts after vulcanization, or the stripping of the tire from the mold.

With the above and other objects in view that will hereinafter appear, the invention further resides in the novel details of construction, combination and arrangement of parts, all of which will be first fully described in the following detailed description, then be particularly pointed out in the appended claims, reference being had to the accompanying drawings, in which:—

Figure 1 is a vertical cross section taken through one side of the mold.

Figure 2 is a top plan view of the mold.

Figure 3 is an edge view of the mold.

Figure 4 is a cross section of the male and female rings, a transverse pin being also shown in proper molding relation therewith.

Figure 5 is a detail cross section of the tread ring.

In the drawings in which like numerals of reference indicate like parts in all of the figures, 1 indicates one annular mold side member (the top side when the mold is in the vulcanizer) which has an inner tire-side forming face 2, an annular ring receiving recess 3 and which is annularly recessed, as at 4, to accommodate the positioning of a tread ring, the peripheral or tread ring engaging wall being inclined as at 5 for a purpose later to be described.

The mold-side 1 also includes a suitable number of clamp lugs 6, the inwardly extended annular clamp shoulder 7 and ribs 8 on the top surface thereof and adapted to provide steam passages therebetween for the purpose well understood in the art.

An opposing mold-side 9 is provided and is constructed similarly to the mold-side 1 to include the tire side forming face 10, an annular ring receiving recess 11, an annular recess 12 for receiving the tread ring, a suitable number of clamp lugs 13 and the inwardly extended annular clamping shoulder 14.

When the mold is assembled as indicated in Figure 1 of the drawings a pair of bead forming rings 15 are centrally clamped between the shoulders 7 and 14 to provide the inner peripheral wall of the tire receiving chamber, the said rings having opposed annular flanges bolted together as at 16.

The recess 3 in the mold-side 1 is adapted to accommodate the positioning of the male or pin-carrying ring 17 which carries the transverse pins 18 that are projected through the cushion portion of the tire so that when the tire is molded transverse ventilated apertures will be formed therein at relatively adjacent positions depending upon the spaced relation of the pins in the said carrying ring.

The recess 11 in the mold-side 9 serves to accommodate the positioning of the female or pin-ends-receiving ring 19 which is provided with suitable apertures or sockets 20 for receiving the tapered ends of the pins 18 in the manner illustrated in Figure 1 of the drawings.

The tread ring 21 is formed in sections, three being shown in this disclosure, and is provided with a tread surface 22 of any desired design. The tread ring is provided with bevelled centering faces 23 one just outside each edge of the tread-forming surface, the said faces being adapted to coact with the similarly bevelled faces 24 with which the male and female rings 17 and 19 are provided and the said coacting bevelled faces of the rings serve to aid in centering and spacing the tread ring as desired.

It will be observed that the main peripheral surface 25 of the tread ring is inclined in the same manner as the wall 5 of the mold side 1 so that when the mold halves are being brought into opposed or assembled relation the inclined walls mentioned will effect a forcing of the tread ring inwardly into proper centered relation with the rings 17 and 19 as above described. The tread ring is also provided with an extended peripheral clamping rib 26 which, when the mold is assembled as illustrated in Figure 1 of the drawings, is clamped between the opposing outside edges of the mold halves 1 and 9. Thus three agencies are provided which coact to assure perfect positioning of the tread ring and the male and female rings 17 and 19 in the position illustrated in Figure 1 of the drawings, namely, the inclined surfaces 5 and 25, the bevelled surfaces 23 and 24 and the clamping of the peripheral rib 26.

It will be observed by reference to Figure 1 of the drawings that the peripheral wall 27 of the tread-ring-receiving recess 12 of the mold half 9 is spaced annularly an appreciable distance from the peripheral wall of that portion of the tread ring which it receives, so that when a tire is to be placed in the mold the tread ring sections may be positioned outwardly against the wall 27 thereby rendering easy and convenient the placing of the tire in the mold by a downward movement. After the tire has been thus placed the top mold half may be applied and the surface 5 thereof will engage the surfaces 25 of the tread ring sections and will draw them to the position illustrated in Figure 1 of the drawing. Thus, when the mold is opened to strip the tire therefrom, the top half 1 of the mold may be readily lifted without any difficulty whatever by inserting a tool between the upper edge of the rib 26 and lower edge of the said mold half and prying it off, the tire tread ring bead-forming devices and male and female rings remaining in place. The male ring may then be readily removed, withdrawing the transverse pins from tire and female ring.

If desired one or both of the mold halves and the male and female rings 17 and 19 may be provided with pin receiving holes and sockets 28 and 29 through which suitable pins may be inserted to interlock the said rings wih their respective mold halves so that when the mold halves are separated the rings will be moved therewith as thus forming a part thereof.

When the male ring 17 is to be removed individually, or after the top mold half has been removed, a suitable tool may be inserted into the socket or sockets 29 with which the same is provided and the ring removed by a prying action, using the upper edge of the tread ring as a fulcrum.

In the drawings the tire carcass is indicated at 30, the beads at 31 while 32 indicates the green rubber body of the tire, 33 the breaker strip and 34 the tread rubber.

In the foregoing description I have disclosed a mold which is constructed in a particularly simple manner, which provides for efficiently vulcanizing tires of the type disclosed and in which the parts may be quickly and easily separated to effect stripping of the tire from the mold without any danger of injury to the tire.

From the foregoing description, taken in connection with the accompanying drawing, it is thought that the novel details of construction, the manner of use and the advantages of my invention will be readily apparent to those skilled in the art to which it relates.

What I claim is:

1. A mold of the class described comprising molding half-members having opposed annular ring receiving grooves formed in the inside faces thereof, a ring mountable in each annular groove, and pins extending across from ring to ring to form ventilating holes in the tire when formed in the mold.

2. A mold of the class described comprising molding half-members having opposed annular ring receiving grooves formed in the inside faces thereof, a ring mountable in each annular groove and having a face-portion adapted to engage and form a portion of the tire surface, a tread-ring for forming the tire tread, said tread-ring and said groove mounted rings having co-engaging portions to effect positioning of the former with relation to the latter of said rings.

3. A mold of the class described comprising molding half-members having opposed annular ring receiving grooves formed in the inside faces thereof, a ring mountable in each annular groove and having a face-portion adapted to engage and form a portion of the tire surface, pins extending across from ring to ring to form ventilating holes in the tire when formed in the mold, a tread-ring for forming the tire tread, said tread-ring and said groove mounted rings having coengaging portions to effect positioning of the former with relation to the latter of said rings.

4. A mold of the class described comprising molding half-members having opposed annular ring receiving grooves formed in the inside faces thereof, a ring mountable in each annular groove and having a face-portion adapted to engage and form a portion of the tire surface, a tread-ring for forming the tire tread, at least one of said rings having at least one socket in the periphery thereof, and said tread-ring being so positioned that a tool may be inserted into the socket of the ring and an edge of the tread-ring used as a fulcrum rest to effect prying loose of the socket equipped ring.

5. A mold of the class described comprising molding half-members having opposed annular ring receiving grooves formed in the inside faces thereof, a ring mountable in each annular groove and having a face-portion adapted to engage and form a portion of the tire surface, a tread-ring for forming the tire tread, said groove mounted rings each having an outer peripheral edge thereof shaped to provide a bevelled surface, and said tread-ring having its side edges shaped to provide bevelled surfaces to coact with the first mentioned bevelled surfaces to effect a centering of said tread-ring.

6. A mold of the class described comprising molding half-members having opposed annular ring receiving grooves formed in the inside faces thereof, a ring mountable in each annular groove and having a face-portion adapted to engage and form a portion of the tire surface, a tread-ring for forming the tire tread, said tread-ring and said groove mounted rings having coengaging portions to effect positioning of the former with relation to the latter of said rings, said tread-ring also having an inclined peripheral surface, and one mold half having a similarly inclined internal surface whereby when the mold halves are brought into opposition the inclined surfaces of tread-ring and mold half will coengage to force the tread-ring and groove mounted ring surfaces into corelation.

7. A mold of the class described comprising molding half-members having opposed annular ring receiving grooves formed in the inside faces thereof, a ring mountable in each annular groove and having a face-portion adapted to engage and form a portion of the tire surface, a tread-ring for forming the tire tread, said groove mounted rings each having an outer peripheral edge thereof shaped to provide a bevelled surface, said tread-ring having its side edges shaped to provide bevelled surfaces to coact with the first mentioned bevelled surfaces to effect a centering of said tread-ring, and a peripheral rib extending from the tread-ring and adapted to be clamped between the mold halves as and for the purposes specified.

8. A mold of the class described comprising molding half-members having opposed annular ring receiving grooves formed in the inside faces thereof, a ring mountable in each annular groove and having a face-portion adapted to engage and form a portion of the tire surface, a tread-ring for forming the tire tread, said tread-ring and said groove mounted rings having coengaging portions to effect positioning of the former with relation to the latter of said rings, said tread-ring also having an inclined peripheral surface, one mold half having a similarly inclined internal surface whereby when the mold halves are brought into opposition the inclined surfaces of tread-ring and mold half will coengage to force the tread-ring and groove mounted ring surfaces into corelation, and a peripheral rib extending from the tread-ring and adapted to be clamped between the mold halves as and for the purposes specified.

9. A mold of the class described comprising upper and lower molding half-members each having an annular tread-ring receiving grooveway, a multi-section tread-ring adapted to have its edges seat in the grooveways of the molding halves, the grooveway of the lower molding half having its peripheral wall spaced outwardly from the peripheral wall of the portion of the tread-ring it receives a distance sufficient to permit placement of the tire on the lower mold section.

10. A mold of the class described comprising molding half-members each having an annular tread-ring receiving grooveway, a tread ring adapted to seat in the grooveways the grooveway of the lower mold half having its peripheral wall spaced outwardly from the peripheral wall of the portion of the tread-ring it receives a distance sufficient to permit placement of the tire on the lower mold section, abutments in the molding half-members for engaging the edges of the tread ring to centrally position the same, and means forming a part of one mold half for engaging a portion of the tread-ring to force said tread-ring into engagement with said abutments.

11. A mold of the class described comprising molding half-members each having an annular tread-ring receiving grooveway, a tread-ring adapted to seat in the grooveways, the grooveway of the lower mold half having its peripheral wall spaced outwardly from the peripheral wall of the portion of the tread-ring it receives a distance sufficient to permit placement of the tire on the lower mold section, abutments in the molding half-members for engaging the edges of the tread-ring to centrally position the same, means for forming a part of one mold half for engaging a portion of the tread-ring to force said tread-ring into engagement with said abutments, and a peripheral rib extending from the tread-ring and adapted to project between the outer edges of the molding half-members to be clamped thereby as and for the purposes described.

12. A mold of the class described comprising molding half-members each having an annular tread-ring receiving grooveway, a tread-ring adapted to seat in the grooveways, abutments in the molding half-members for engaging the edges of the tread-ring to centrally position the same, a peripheral rib extending from the tread-ring and adapted to project between the outer edges of the molding half-members to be clamped thereby, the rib being positioned to provide a wide peripheral wall at one side thereof and a narrow peripheral wall at the other side thereof, the wide wall being inclined and the molding half-member peripheral wall which it engages being similarly inclined whereby when the said half-members are brought together the tread-ring will be forced into engagement with the abutments.

13. A mold of the class described comprising molding half-members having opposed annular ring receiving grooves formed in the inside faces thereof, a ring mountable in each annular groove and having a face-portion adapted to engage and form a portion of the tire surface, a tread-ring for forming the tire tread, at least one molding half-member and the groove mounted ring carried thereby having registering apertures into which may be inserted pins for causing said half member and ring to move together when the mold is being stripped.

14. A mold of the class described comprising upper and lower molding half-members each having an annular tread-ring receiving grooveway, a multi-section tread-ring adapted to have its edges seat in the grooveways of the molding halves, the grooveway of the lower molding half having its peripheral wall spaced outwardly from the peripheral wall of the portion of the tread-ring it receives a distance sufficient to permit placement of the tire on the lower mold section, said upper mold half and said tread-ring sections having wedging surfaces whereby when the upper mold half is placed in position and forced toward the lower mold half the tread-ring sections will be forced to positions concentric to the axis of the tire.

FREDERICK A. KRUSEMARK.